United States Patent
Kinoshita et al.

(10) Patent No.: US 6,683,131 B1
(45) Date of Patent: Jan. 27, 2004

(54) PROTECTIVE COATING OF METAL AND PRODUCT THEREFROM

(76) Inventors: Yasuhiro Kinoshita, No. 206, 2-14-10 Tsumadahigashi, Atsuhi City, Kanagawa Pref. (JP), 254-0014; Keiichi Ueno, 2566 Shinomiya, Hiratsuka City, Kanagawa Pref. (JP), 254-0014; Takashi Koyama, Motohong-cho, Hachioji City, Kanagawa Pref. (JP), 192-0051

( * ) Notice: Subject to any disclaimer, the term of this patent is extended or adjusted under 35 U.S.C. 154(b) by 0 days.

(21) Appl. No.: 09/936,474
(22) PCT Filed: Mar. 16, 2000
(86) PCT No.: PCT/US00/06897
  § 371 (c)(1), (2), (4) Date: Nov. 28, 2001
(87) PCT Pub. No.: WO00/58086
  PCT Pub. Date: Oct. 5, 2000

(30) Foreign Application Priority Data
Mar. 16, 1999 (JP) .............................................. 11-70470

(51) Int. Cl.$^7$ .............................. C08J 3/00; C08K 3/20; C08L 75/00; B32B 27/00; B32B 27/40
(52) U.S. Cl. ................ 524/591; 428/423.1; 428/425.9; 428/457; 428/461; 428/463; 428/469; 523/402; 523/406; 523/409; 523/412; 523/440; 524/158; 524/275; 524/276; 524/277; 524/366; 524/368; 524/375; 524/376; 524/839; 524/840
(58) Field of Search .......................... 428/423.1, 425.9, 428/457, 461, 463, 469; 523/402, 406, 409, 412, 440; 524/158, 275, 276, 277, 366, 368, 375, 376, 591, 839, 840, 589, 590

(56) References Cited

U.S. PATENT DOCUMENTS

4,537,604 A * 8/1985 Dawson et al.
5,798,136 A * 8/1998 Landry-Coltrain et al.

FOREIGN PATENT DOCUMENTS

JP    2 617838    3/1993
JP    2 719571    5/1994

OTHER PUBLICATIONS

JP03017189 Abstract.
JP06292859 Abstract.
JP05–118550 Abstract.
JP06104799.

* cited by examiner

*Primary Examiner*—Patrick D. Niland
(74) *Attorney, Agent, or Firm*—Stephen D. Harper; Mary K. Cameron

(57) ABSTRACT

A water-based liquid treatment composition for metal surfaces comprises water, (A) dissolved, dispersed, or both dissolved and dispersed urethane resin, acrylic resin; or both urethane and acrylic resins; (B) dissolved, dispersed, or both dissolved and dispersed curing agent molecules; (C) dispersed silica powder; (D) dispersed oxidized polyethylene wax with an average particle size of 0.01 to 0.2 μm; and (E) dissolved, dispersed, or both dissolved and dispersed molecules that conform to the immediately following general chemical formula (I):

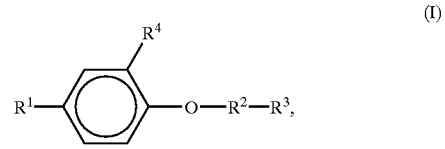

wherein: $R^1$ represents a $C_1$ to $C_{20}$ alkyl moiety or a $C_2$ to $C_{20}$ alkenyl moiety; $R^2$ represents a block homo-oligomer of oxyethyleine or a block co-oligomer of oxyethylene and oxypropylene that conforms to the general chemical formula —$(C_2H_4O)_m$—$(C_3H_6)_n$—, wherein m represents an integer from 5 to 20 and n represents an integer from 0 to 10; $R^3$ represents a hydrogen moiety or $SO_3M$, where M represents a hydrogen atom, an is alkali metal ion, or an ammonium ion; and $R^4$ represents a hydrogen atom, a $C_1$ to $C_4$ alkyl moiety, or a $C_2$ to $C_4$ alkenyl moiety. The composition contains these components in amounts such that: the total solids from components (A) and (B) constitute from 50 to 95% by weight of the total solids from components (A) through (E); the solids from component (C) constitute from 3 to 40% by weight of the total solids from components (A) through (E); the total solids from components (D) and (E) constitute from 2 to 20% by weight of the total solids from components (A) through (E); and the ratio by weight of solids from component (A) to solids from component (B) is from 4:1.0 to 49:1.00. Applying this composition over a metal surface and drying the composition into place on the surface produces an excellent resistance to corrosion in damaged regions in addition to an excellent general corrosion resistance and excellent paint adherence. Treatment in this manner is especially advantageous when applied over a pre-existing chromate conversion coating on the metal surface.

24 Claims, No Drawings

PROTECTIVE COATING OF METAL AND PRODUCT THEREFROM

BACKGROUND OF THE INVENTION

This invention relates to a water-based treatment composition for application to metal surfaces. The treatment composition can be used to form, on the metal surface, resin coatings that exhibit an excellent corrosion resistance in flat areas, an excellent corrosion resistance in damaged areas, and an excellent paint adherence. This invention also relates to surface-treated metal articles of manufacture, particularly metal sheets, on which such a resin coating has been formed.

Zinc- and zinc alloy-plated steel sheet is in wide use, for example, for household electrical appliances and building materials. By itself, zinc-surfaced steel sheet of this type has an inadequate corrosion resistance and paint adherence to its zinc-rich surface and for this reason is typically subjected to a chromate conversion treatment or phosphate conversion treatment prior to being subjected to mechanical forming operations (e.g., press working or bending) and/or being painted. However, a substantial amount of zinc-surfaced sheet is used without being painted.

The type of surface-treated zinc-surfaced steel sheet known as "chromate conversion-coated" has frequently been used in these unpainted applications. However, chromate conversion-coated surfaces suffer from color variations caused by differences in the chromate coating weight and also retain. fingerprint impressions that may be made during forming operations and assembly. Fingerprint-resistant zinc-surfaced steel sheet has been used in order to overcome these problems. This fingerprint-resistant zinc-surfaced steel sheet carries an organic coating formed over the chromate coating. With the goal of preventing fingerprint uptake, this fingerprint-resistant sheet is produced by laying down an organic resin layer with a thickness around 1 micrometre (hereinafter usually abbreviated as "$\mu$m") after the chromate treatment has been executed on the surface of the zinciferous-plated steel sheet. In addition to fingerprint resistance, the coating on fingerprint-resistant steel sheet must exhibit a variety of properties, such as corrosion resistance, solvent resistance, paint adherence, and damage resistance.

Among these various properties, the ability to resist damage has been in strong demand in recent years. This property is in demand in order to resist the damage to molding surfaces that can be produced when the vibrations generated during the transport of molded articles cause the moldings to rub against one another or to rub against their containers (e.g., cardboard). This makes impairments in quality inevitable, since these damaged areas exhibit a poorer corrosion resistance than ordinary organic-coated zinc-surfaced steel sheet.

In response to this circumstance, various technologies related to surface-treated zinc-surfaced steel sheet have appeared that take into account damage resistance in addition to corrosion resistance and paint adherence. These technologies can be exemplified by the methods described in Japanese Laid Open (Kokai or Unexamined) Patent Application Number Hei 3-17189 (17,189/1991), Japanese Published (Kokoku or Examined) Patent Application Number Hei 6-104799 (104,799/1994), and Japanese Laid Open (Kokai or Unexamined) Patent Application Number Hei 6-292859 (292,859/1994).

Japanese Laid Open (Kokai or Unexamined) Patent Application Number Hei 3-17189 discloses a method that relates to resin coatings comprising fluororesin powder and silica powder blended into urethane-modified polyolefin resin. The characteristic feature of this method resides in the use of the fluororesin powder to protect damaged areas. However, this method requires the use of surfactant in order to generate a uniform dispersion of the fluororesin powder in a water-based solution. The use of this surfactant results in an overall lower level of corrosion resistance and thereby prevents the development of a satisfactory corrosion resistance.

Japanese Published (Kokoku or Examined) Patent Application Number Hei 6-104799 discloses a method that relates to coatings that contain polyester resin, cross-linker, and polyethylene wax with an average molecular weight of 2,000 to 8,000. Due to the use in this method of polyester resin as the base resin, the resulting coating itself has an inadequate resistance to hydrolysis, which again prevents the development of a satisfactory corrosion resistance.

Japanese Laid Open (Kokai or Unexamined) Patent Application Number Hei 6-292859 discloses a method that relates to a coating afforded by the addition of spherical oxidized polyethylene wax powder and chain (coagulated network structure) colloidal silica to resin itself afforded by the addition of ambient temperature-cross-linking epoxy resin to active hydrogen-functional urethane resin. Colloidal silica, upon its adhesion to solid surfaces, functions to raise the friction coefficient—a property known as friction enhancement. In the case of use of chain (coagulated network structure) colloidal silica as in the method under discussion, the damage resistance is impaired by the structure of the colloidal silica itself. This method therefore also uses spherical polyethylene wax, but since this method uses a drying temperature lower than 100° C. the polyethylene wax ends up buried in the resin coating. The lubricity therefore remains inadequate and a satisfactory corrosion resistance at damaged areas cannot be developed.

Thus, as described above, it has not been possible using the heretofore disclosed technologies to produce surface-treated zinc-surfaced steel sheet that exhibits an excellent corrosion resistance and paint adherence and also an excellent corrosion resistance in damaged areas.

Japanese Laid Open (Kokai or Unexamined) Patent Application Number Hei 5-118550 (118,550/1993), Granted Japanese Patent 2,719,571, and Granted Japanese Patent 2,617,838 describe (water-based) lubricating paints that contain urethane resin and/or epoxy resin, silica or silica powder, and wax (including polyethylene wax) and that are used to form resin coatings on cold-rolled steel sheet, zinciferous-plated steel sheet, or aluminiferous metal sheet. The invention described hereinbelow differs from these inventions in having different compositional requirements and different advantageous effects.

This invention is directed to solving the problems associated with the prior art as described above. An object of this invention is to provide a water-based agent, for treating metal surfaces, that can be used to form an organic resin coating that exhibits an excellent corrosion resistance, excellent paint adherence, and in particular an excellent resistance to corrosion in damaged regions. An additional object of this invention is to provide surface-treated metal sheet as afforded by the use of the water-based surface treatment composition according to this invention.

BRIEF SUMMARY OF THE INVENTION

It has been found that these problems can be solved by the use of a water-based surface treatment composition containing urethane resin and/or acrylic resin, curing agent, silica powder, oxidized polyethylene wax of specified particle size, and a compound with a special structure as dispersing agent.

This invention also relates to surface-treated metal sheet that characteristically comprises metal whose surface carries a first layer comprising a chromate coating layer having a coating weight that is 3 to 100 milligrams per square meter (hereinafter usually abbreviated as "mg/m$^2$") as chromium metal and a second layer with a coating weight from 0.3 to 3.0 grams per square meter (hereinafter usually abbreviated as "g/m$^2$") of a resin coating layer that has been formed by the application of the above-described water-based surface treatment composition followed by drying.

DETAILED DESCRIPTION OF THE INVENTION

A water-based treatment composition according to the invention comprises, preferably consists essentially of, or more preferably consists of, water and the following components:

(A) dissolved, dispersed, or both dissolved and dispersed urethane resin, acrylic resin; or both urethane and acrylic resins;

(B) dissolved, dispersed, or both dissolved and dispersed curing agent molecules;

(C) dispersed silica powder;

(D) dispersed oxidized polyethylene wax with an average particle size of 0.01 to 0.2 μm; and (E) dissolved, dispersed, or both dissolved and dispersed molecules that conform to the immediately following general chemical formula (I):

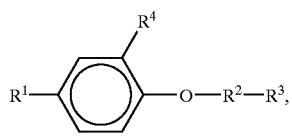

(I)

wherein: $R^1$ represents a $C_1$ to $C_{20}$ alkyl moiety or a $C_2$ to $C_{20}$ alkenyl moiety; $R^2$ represents a block homo-oligomer of oxyethylene or a block co-oligomer of oxyethylene and oxypropylene that conforms to the general chemical formula —$(C_2H_4O)_m$—$(C_3H_6)_n$—, wherein m represents an integer from 5 to 20 and n represents an integer from 0 to 10; $R^3$ represents a hydrogen moiety or $SO_3M$, where M represents a hydrogen atom, an alkali metal ion, or an ammonium ion; and $R^4$ represents a hydrogen atom, a $C_1$ to $C_4$ alkyl moiety, or a $C_2$ to $C_4$ alkenyl moiety, wherein: the total solids from components (A) and (B) constitute from 50 to 95% by weight of the total solids from components (A) through (E); the solids from component (C) constitute from 3 to 40% by weight of the total solids from components (A) through (E); the total solids from components (D) and (E) constitute from 2 to 20% by weight of the total solids from components (A) through (E); and the ratio by weight of solids from component (A) to solids from component (B) is from 4:1.0 to 49:1.00.

The solids from component (E) preferably make up from 10 to 40% by weight of the total solids from components (D) and (E). Independently, the glass-transition temperature of component (A) is preferably from −40 to 0° C. Also independently of both other preferences in this paragraph, component (B) is preferably selected from epoxy resins and more preferably from epoxy resins that contain at least three epoxy groups in each molecule.

A urethane resin to be used in component (A) of a composition according to this invention preferably is synthesized from four types of starting materials: polyol molecules, polyisocyanate molecules, carboxylic acid molecules, and molecules that contain at least three active hydrogens.

The polyol molecules are exemplified by: ethylene oxide and/or propylene oxide adducts of low-molecular-weight polyols such as ethylene glycol, diethylene glycol, triethylene glycol, 1,2-propylene glycol, 1,3-propylene glycol, 1,2-butylene glycol, 1,3-butylene glycol, 1,4-butylene glycol, hexamethylene glycol, hydrogenated bisphenol A, bisphenol A, trimethylolpropane, and glycerol; polyether polyols such as polyethylene glycols, polypropylene glycols, polyethylene/polypropylene glycols, polycaprolactone polyols, polyolefin polyols, and polybutadiene polyols; and hydroxyl-terminated polyester polyols afforded by the reaction of the aforesaid polyols and a polybasic acid such as succinic acid, glutamic acid, adipic acid, sebacic acid, phthalic acid, isophthalic acid, terephthalic acid, tetrahydrophthalic acid, endomethylenetetrahydrophthalic acid, and hexahydrophthalic acid.

The polyisocyanate molecules can be exemplified by aliphatic, alicyclic, and aromatic polyisocyanates. Preferred examples of the polyisocyanate component are tetramethylene diisocyanate, hexamethylene diisocyanate, lysine diisocyanate, hydrogenated xylylene diisocyanate, 1,4-cyclohexylene diisocyanate, 4,4'-dicyclohexylmethane diisocyanate, 2,4'-dicyclohexylmethane diisocyanate, isophorone diisocyanate, 3,3'-dimethoxy-4,4'-biphenylenediisocyanate, 1,5-naphthalenediisocyanate, 1,5-tetrahydronaphthalene diisocyanate, 2,4-tolylene diisocyanate, 2,6-tolylene diisocyanate, 4,4'-diphenylmethane diisocyanate, 2,4'-diphenylmethane diisocyanate, phenylene diisocyanate, xylylene diisocyanate, and tetramethylxylylene diisocyanate. Among these, coatings with a particularly good corrosion resistance and chemical resistance are obtained by the use of aliphatic and alicyclic polyisocyanates, e.g., tetramethylene diisocyanate, hexamethylene diisocyanate, lysine diisocyanate, hydrogenated xylylene diisocyanate, 1,4-cyclohexylene diisocyanate, 4,4'-dicyclohexylmethane diisocyanate, 2,4'-dicyclohexylmethane diisocyanate, and isophorone diisocyanate.

The carboxylic acid molecules can be exemplified by 2,2-dimethylolpropionic acid, 2,2-dimethylolbutyric acid, and 2,2-dimethylolvaleric acid.

The molecules containing at least three active hydrogens can be exemplified by melamine, diethylenetriamine, trimethylolpropane, pentaerythritol, glycerol, and their ethylene oxide and/or propylene oxide adducts.

A compound containing two active hydrogens (chain extender) as typically used in urethane resin synthesis can also be used as necessary or desired for synthesis of the urethane resin under consideration. These chain extenders can be exemplified by polyols such as ethylene glycol, propylene glycol, neopentyl glycol, 1,6-hexanediol, and the ethylene oxide and/or propylene oxide adducts of the preceding, and by amines such as ethylenediamine, propylenediamine, hexamethylenediamine, tolylenediamine, xylylenediamine, diaminodiphenylmethane, diaminodicyclohexylmethane, piperazine, 2-methylpiperazine, isophoronediamine, succinic dihydrazide, adipic dihydrazide, and phthalic dihydrazide.

The starting components for the urethane resin used in this invention are preferably employed in the following quantities, in each case per 100 weight parts of the urethane resin: the polyol component at 30 to 70 weight parts and preferably 35 to 65 weight parts, the polyisocyanate component at 20 to 50 weight parts and preferably 25 to 40 weight parts, the carboxylic acid component at 0.5 to 10 weight parts and preferably 1 to 8 weight parts, and the compound containing at least three active hydrogens at 0.1 to 5 weight parts and preferably 0.2 to 3 weight parts. The chain extender, when used, preferably is used at 1 to 15 weight parts and preferably 3 to 10 weight parts, in each case per 100 weight parts urethane resin.

The procedure for synthesizing the urethane resin used in this invention is not critical and those procedures known in the concerned art can be used; however, synthesis by the industrially widely used prepolymer technique is preferred. In the prepolymer technique, the urethane resin is synthesized by (i) reacting the polyol component, polyisocyanate component, carboxylic acid component, and compound containing at least three active hydrogens in an organic solvent that is inert to the reaction and that has a high affinity for water and (ii) dispersing the resulting polymer in an aqueous solution containing neutralizing agent and the chain extender.

The aforesaid organic solvent that is inert to the polymerization reaction is exemplified by acetone, methyl ethyl ketone, dioxane, tetrahydrofuran, N-methyl-2-pyrrolidone, dimethylformamide, dimethylacetamide, dimethyl sulfoxide, and ethyl acetate. The neutralizing agent can be exemplified by organic amines such as trimethylamine, triethylamine, tripropylamine, tributylamine, N-methyldiethanolamine, and triethanolamine, and by inorganic bases such as sodium hydroxide, potassium hydroxide, and ammonia.

The molecular weight of the urethane resin product is not critical, but molecular weights of at least 5,000 are preferred.

Acrylic resins suitable for use in this invention as part or all of component (A) are copolymers afforded by the copolymerization of acrylic and/or methacrylic acid with another monomer containing an ethylenic double bond. This other monomer is exemplified by maleic acid, maleic anhydride, fumaric acid, crotonic acid, itaconic acid, citraconic acid, cinnamic acid, 2-hydroxyethyl (meth)acrylate[1], 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 2-hydroxyethyl (meth)allyl ether, 3-hydroxypropyl (meth)allyl ether, 4-hydroxybutyl (meth)allyl ether, allyl alcohol, glycidyl (meth)acrylate, 2-(1-aziridinyl)ethyl acrylate, vinyltrimethoxysilane, vinyltriethoxysilane, allyl glycidyl ether, iminol methacrylate, acryloylmorpholine, N-methylol (meth)acrylamide, N-methoxymethyl-(meth)acrylamide, N-ethoxymethyl(meth)acrylamide, N-butoxymethyl(meth) acrylamide, (meth)acrylamide, N-methyl(meth)acrylamide, N,N-dimethyl(meth)acrylamide, N-dimethylaminopropyl (meth)acrylamide, vinyl formate, vinyl acetate, vinyl butyrate, vinyl acrylate, styrene, α-methylstyrene, tert-butylstyrene, vinyltoluene, (meth)acrylonitrile, cinnamonitrile, (meth)acryloxyethyl phosphate, bis(meth) acryloxyethyl phosphate, and (meth)acryloxyethyl phenyl acid phosphate.

[1]The symbol "(meth)" in any following chemical name means "methyl substituted or unsubstituted".

The (meth)acrylic acid is used preferably at from 1 to 20 weight parts and more preferably at from 2 to 15 weight parts, in each case per 100 weight parts of the acrylic resin used in this invention.

The procedure for synthesizing the acrylic resin used by this invention is not critical, but a procedure that has proven satisfactory on an industrial basis is preferably employed. An example of one such procedure is emulsion polymerization, in which polymerization is carried out after the monomer has been homogeneously dispersed and emulsified in water using a surfactant known as an emulsifying agent. An example of another such procedure is suspension polymerization, in which the monomer is dispersed in a solvent—such as water—in which the monomer is either completely or almost completely insoluble and the polymerization reaction is then carried out in the small drops of suspended monomer using a polymerization initiator that is soluble in the monomer but poorly soluble in the solvent.

While the molecular weight of the acrylic resin used in this invention is not critical, molecular weights of 10,000 to 1,000,000 as measured by gel permeation chromatography (hereinafter usually abbreviated as "GPC") are preferred.

The resin (A) used in this invention preferably has a glass-transition temperature from −40 to 0° C. and more preferably from −40 to −5° C. Glass-transition temperatures below −40° C. are undesirable because they produce a poor blocking resistance in the ultimately obtained coating. Moreover, the physical properties of the resin coating undergo a major change across the glass-transition temperature boundary. Since after the molding operation the moldings will generally be handled at temperatures in the range from 10 to 50° C., a glass-transition temperature in this range is very likely to result in changes in the physical properties of the resin coating merely as a consequence of changes in air temperature and therefore in a corresponding deterioration in the coating's resistance to damage. In addition, glass-transition temperatures in excess of 50° C. result in a deterioration in the film-forming properties of the coating, which necessitates an uneconomical raising of the temperature at which the treatment composition is dried. In sum, then, the glass-transition temperature is preferably in the range from −40 to 0° C.

The glass-transition temperature of the resins was determined from the inflection point in the rate of elasticity loss in measurement at a frequency of 100 Hertz using a Rheograph Solid S-1 instrument (from Kabushiki Kaisha Toyo Seiki Seisakusho). The measurement specimen was a film with a thickness of 100 $\mu$m, width of 8 millimeters (hereinafter usually abbreviated as "mm"), and length of 30 mm. The specimen was dried for 30 minutes at 100° C. prior to measurement.

A curing agent (B) is used by this invention in order to bring about a more prominent manifestation of the properties of the resin (A). The curing agent (B) used in this invention is preferably an isocyanate compound, aziridine compound, or epoxy resin. An epoxy resin containing at least three epoxy groups in each molecule is most preferred for use as the curing agent (B). The resin used in this invention as component (A) contains carboxylic groups, and major enhancements in coating properties are obtained by the formation of a three-dimensional network structure in the produced resin through the reaction of these carboxyl groups and the functional groups (isocyanate group, aziridinyl group, or epoxy group) in the curing agent. The epoxy resin under consideration can be exemplified by novolac epoxy resins and the epoxy resins afforded by the reaction of epichlorohydrin with a compound containing at least three OH groups. The molecular weight of the epoxy resin used in this invention is not critical, but molecular weights no greater than 3,000 as measured by GPC are preferred.

The solids weight ratio between components (A) and (B) is more preferably from 10:1.0 to 40:1.00. An (A):(B) ratio below 4:1.0 does not usually result in a satisfactory manifestation of the properties of the resin (A). Moreover, unreacted curing agent will usually remain at an (A):(B) ratio below 4:1.0, and any residual unreacted curing agent will function as a plasticizer and thereby reduce the corrosion resistance. The effects from the addition of curing agent are so weak at an (A):(B) ratio in excess of 49:1.00 that a satisfactory corrosion resistance usually cannot be obtained.

The total solids from components (A) and (B) must make up 50 to 95% by weight—and preferably make up 60 to 85% by weight—of the grand total solids from all the components (A), (B), (C), (D), and (E) in the water-based surface treatment composition of this invention. The water resistance of the coating itself is reduced when this value falls below 50% by weight. The corrosion resistance in damaged areas is reduced when this value exceeds 95% by weight.

The particle size, particle morphology, and type are not critical for the silica powder component (C) used in this invention, but the range of 3 to 30 nanometers (hereinafter usually abbreviated as "nm") is preferred for the particle size. The silica powder will occur dispersed in the water in the water-based surface treatment composition of this invention. The silica powder must make up 3 to 40% by weight—and preferably makes up 10 to 30% by weight—of the total solids. A proportion below 3% by weight usually results in little improvement in the corrosion resistance, while a proportion in excess of 40% by weight usually results in a weak binder activity by the resin component (A) and hence in a reduced corrosion resistance.

The oxidized polyethylene wax component (D) used in this invention is added in order to improve the resistance to damage. The average particle size of the oxidized polyethylene wax (D) must be from 0.01 to 0.2 $\mu$m and is preferably from 0.05 to 0.18 $\mu$m. As a general rule, the friction coefficient, which is used as an index of lubricity, declines as the wax particle size increases. However, the friction coefficient does not necessarily strictly correlate with resistance to damage, and the relationship (scuffing resistance) between the number of sliding traverses (or sliding distance) and the friction coefficient is more important. As a result of extensive investigations into the relationship between the average wax particle size and the number of sliding traverses, the inventors have discovered that an excellent resistance to damage is obtained at an average wax particle size of 0.01 to 0.2 $\mu$m. Since the average wax particle size depends on the melt viscosity of the wax and the performance of the apparatus used for dispersion, average wax particle sizes below 0.01 $\mu$m are uneconomical due to their requirement for higher performance equipment. In the case of sizes in excess of 0.2 $\mu$m, the wax protruding from the coating surface is easily removed during sliding and the continuous sliding properties are impaired as a result.

The molecular weight and melting point of the oxidized polyethylene wax (D) are not critical to this invention, but this component preferably has an acid value in the range from 5 to 50 and more preferably in the range from 10 to 30. An acid value below 5 results in an almost complete absence of miscibility between the wax and resin, which results in an almost complete segregation of the wax at the coating surface during coating formation with a concomitant reduction in damage resistance and paint adherence. Due to the strong hydrophilicity of the wax at an acid value in excess of 50, the wax itself has a reduced lubricity and the damage resistance is thus impaired.

The dispersing agent (E) used in this invention is a compound conforming to general chemical formula (I) as given above. $R^1$ in formula (I) is preferably a $C_5$ to $C_{20}$ alkyl moiety or a $C_2$ to $C_5$ alkenyl moiety; m is preferably an integer from 8 to 20; n is preferably an integer from 0 to 5; $R^3$ is preferably a hydrogen atom or $SO_3NH_4$; and $R^4$ is preferably a hydrogen atom or a $C_2$ to $C_4$ alkenyl moiety. The oxidized polyethylene wax component (D) employed in this invention will generally be used as the water-based dispersion produced using the dispersing agent component (E). The method for dispersing the oxidized polyethylene wax is not critical and those methods used industrially can be used here. The average particle size of the oxidized polyethylene wax (D) referenced above is the value occurring in the aforesaid water-based dispersion of this component.

The solids from component (E) preferably make up from 5 to 40% by weight and more preferably from 10 to 30% by weight of the total solids from components (D) and (E). The dispersion stability of the oxidized polyethylene wax usually will be unsatisfactory when this value is below 5% by weight, while the water resistance of the coating obtained using the corresponding water-based surface treatment composition will be impaired when this value exceeds 40% by weight.

With respect to the proportion in which this water-based dispersion is used, the total solids from components (D) and (E) must make up from 2 to 20% by weight, preferably make up from 3 to 15% by weight, and more preferably make up from 3 to 10% by weight, of the grand total of solids in the water-based surface treatment composition of this invention from all components (A) through (E). Little improvement in damage resistance is usually obtained at less than 2% by weight, while the topcoat paintability is often impaired above 20% by weight.

In regards to optional components, the water-based surface treatment composition of this invention may contain a surfactant known as a wetting improver in order to promote the formation of a uniform coating on the substrate, an electrically conductive substance in order to enhance the weldability, colored pigment to enhance the aesthetics, and solvent in order to improve the coating-forming performance.

The water-based surface treatment composition of this invention can be prepared by mixing the above-described components (A), (B), (C), and a separate water-based dispersion made by dispersing component (D) in a solution of component (E) in water, along with any of the above-described optional components if desired. The order of component addition otherwise is not critical, and mixing can be effected, for example, by stirring with a propeller-type stirrer.

The resulting water-based surface treatment composition of this invention preferably has a solids concentration in the range from 5 to 50% by weight and more preferably from 5 to 40% by weight. A solids concentration below 5% by weight should be avoided for the correspondingly long drying times it entails, while a solids concentration in excess of 50% by weight causes the treatment composition itself to have a high viscosity and hence runs the risk of causing handling problems.

Metals that can be coated with the water-based surface treatment composition of this invention can be exemplified by metal sheet such as cold-rolled steel sheet, zinciferous-plated steel sheet, aluminiferous-plated steel sheet, and aluminum sheet.

The water-based surface treatment composition of this invention can be directly painted on the above-described metals. However, in order to fully manifest the advantageous effects of this invention, a chromate coating is preferably first produced by chromate treatment by the usual methods and the water-based surface treatment composition of this invention is then coated thereon in order to form a resin coating.

Chromate treatments are exemplified by electrolytic chromate treatments in which the chromate coating is produced by electrolysis; reactive chromate treatments in which the coating is formed by reaction with the substrate and the excess treatment bath is subsequently washed off; and dry-in-place chromate treatments in which the treatment bath is applied to the workpiece and a coating is produced by drying without a water rinse. Any of these chromate treatment methods can be used with this invention.

The formation of a resin coating can be effected by application of the water-based surface treatment composition of this invention at 10 to 50° C. on the undercoating formed by chromate treatment as described above and thereafter drying under conditions such that the highest temperature reached by the underlying metal during drying was 60 to 200° C. The water-based surface treatment composition can be applied by the usual methods, for example, roll coating, immersion, or electrostatic coating.

The surface-treated metal sheet of this invention that is produced by the herein-above-described two-step treatment characteristically comprises metal whose surface carries a first layer comprising a chromate coating layer having a weight of 3 to 100 $mg/m^2$ as chromium metal and a second layer comprising 0.3 to 3.0 $g/m^2$ of a resin coating layer as formed by the application and drying of the water-based treatment composition for metal surfaces of this invention. The weight of the chromate coating layer is preferably from 3 to 50 $mg/m^2$ as chromium metal and more preferably is from 5 to 40 $mg/m^2$ as chromium metal.

Little improvement in corrosion resistance is obtained at a chromium add-on below 3 $mg/m^2$, while add-ons in excess of 100 $mg/m^2$ are uneconomical because no additional improvement in corrosion resistance is obtained at such levels. The improvement in corrosion resistance is usually inadequate at a resin coating weight (dry basis) below 0.3 $g/m^2$, while weights in excess of 3.0 $g/m^2$ are uneconomical again because no additional improvement in corrosion resistance is obtained at such levels.

The resin coating formed by the application and drying of the water-based surface treatment composition of this invention and hence the corresponding surface-treated metal sheet exhibit an excellent corrosion resistance in flat areas, an excellent corrosion resistance in damaged areas, and an excellent paint adherence. No particular restrictions apply to the topcoat that may be painted on the resin coating, and the topcoat is exemplified by ambient temperature-drying melamine-alkyd paints, bakable melamine-alkyd paints, acrylic resin paints, and ultraviolet light-curing resin paints.

This invention will be explained in greater detail below using preparative, working, and comparative examples. While the working examples that follow are provided in order to describe the invention in greater detail, they in no way limit or restrict this invention.

PREPARATION OF METALS FOR TESTING AS SUBSTRATES (1) Metal Substrates to be Treated The following commercial materials were used as the test substrates:

Electrogalvanized steel sheet (hereinafter usually abbreviated as "EG") sheet thickness=0.8 mm, plating weight=20 $g/m^2$ of zinc on each side;

5% Al-95% Zn-plated steel sheet (hereinafter usually abbreviated as "GF") sheet thickness=0.8 mm, plating weight=90 $g/m^2$ on each side;

Type 5182 aluminum sheet (hereinafter usually abbreviated as "AL") sheet thickness=1.0 mm.

(2) Degreasing

Each of the substrates as noted in part (1) above was degreased using a silicate-based alkaline degreaser (FAINCLEANA® 4336 degreaser concentrate of Nihon Parkerizing Co., Ltd.). The treatment comprised spraying a concentration of 20 g/L of the concentrate in water for 2 minutes at 60° C., followed by a rinse with tapwater.

(3) Undercoating Treatments
(3-1) Reactive Chromate Conversion Treatment (Substrates: EG, GF)

The test coupon was prepared by spraying with ZINCHROMO® 357 conversion coating (product of Nihon Parkerizing Co., Ltd.) for 5 seconds at a bath temperature of 50° C. followed by rinsing with tapwater and then air drying.
(3-2) Dry-in-place chromate conversion treatment (substrates: EG, GF)

The test coupon was prepared by the application with a roll coater of ZINCHROMO® 1300AN conversion coating (product of Nihon Parkerizing Co., Ltd.) followed directly—without a water rinse—by drying for 10 seconds at an ambient atmosphere temperature of 200° C. The temperature achieved by the coupon during drying was 100° C.
(3-3) Reactive Chromate Treatment (Substrate: AL)

The test coupon was prepared by spraying for 5 seconds at a bath temperature of 50° C. with ALCHROM® 713 conversion coating (product of Nihon Parkerizing Co., Ltd.) followed by washing with tapwater and then drying in air.

PREPARATION OF THE WATER-BASED SURFACE TREATMENT COMPOSITIONS

The resin reported in Table 1, the curing agent reported in Table 2, the silica powder reported in Table 3, and the water-based wax dispersion reported in Table 4 were mixed at room temperature in the order given while stirring with a propeller stirrer. Distilled water was added in order to adjust the solids concentration, thereby giving the water-based surface treatment compositions in the working and comparison examples as reported in Table 5. Each water-based wax dispersion was prepared by introducing the entire amount of water and wax and dispersing agent as reported in Table 4 into an autoclave and stirring while heating at 130 to 140° C.

TABLE 1

Resins Used in the Working and Comparative Examples

| Resin Ident-ifier | Product Name | Product Man-ufac-turer | Resin Type | Glass-Tran-sition Tem-per-ature | Solids Con-centra-tion | Reason If Any Why Resin is not within the Scope of the Claims |
|---|---|---|---|---|---|---|
| A1 | SUPER-FLEX 198 107 M | Daiichi Kogyo Seiyaku KK | Urethane | −40° C. | 25% | |
| A2 | ADEKA BON TIGHTER ™ HUX-580 | Asahi Denka Kogyo KK | Urethane | −14° C. | 62% | |
| A3 | PRIMAL ™ K-3 | Rohm & Haas | Acrylic | −27° C. | 46% | |
| A4 | PRIMAL ™ NW-1715 | Rohm & Haas | Acrylic | −6° C. | 44% | |
| A5 | VYLONA ™ MD-1930 | Toyobo KK | Ester | −10° C. | 30% | Resin is not urethane or acrylic |

TABLE 2

Curing Agents Used in the Working and Comparative Examples

| Curing Agent | Product Name | Product Manufacturer | Cross-Linking Functional Groups | Solids Con-centration |
|---|---|---|---|---|
| B1 | DINACOL ™ EX-512 | Nagase Kasei KK | Epoxy | 100% |
| B2 | ELASTRON ™ BN-69 | Daiichi Kogyo Seiyaku KK | Isocyanate | 40% |

TABLE 3

Silica Powders Used in the Working and Comparative Examples

| Silica Identifier | Product Name | Manufacturer | Solids Concentration |
|---|---|---|---|
| C1 | SNOWTEX ™ N | Nissan Chemical Industries, Ltd. | 20% |
| C2 | SNOWTEX ™ O | Nissan Chemical Industries, Ltd. | 20% |

Reasons why Compositions 17–25 as shown in Table 5 are not within the scope of the claimed invention are shown in Table 6.

PROCEDURE FOR APPLYING THE WATER-BASED SURFACE TREATMENT COMPOSITIONS TO THE TEST COUPONS

The particular water-based surface treatment composition prepared as described above was applied to the particular test substrate surface, using a bar coater, followed by drying for 10 seconds at an ambient atmosphere temperature of 240° C. The peak metal temperature reached by the substrate during drying was 100° C. The add-on was adjusted by suitable adjustments in the solids concentration in the composition and the type of bar coater.

COATING PERFORMANCE TESTING (1) Corrosion Resistance in Flat Areas

Salt-spray testing according to Japanese Industrial Standard (hereinafter usually abbreviated as "JIS") Z-2371 was carried out for 240 hours on the EG material, 480 hours on the GF material, and 600 hours on the AL material. The status of white rust production was then evaluated and reported on the following scale:

TABLE 4

Water-based Wax Dispersions Used in the Working and Comparative Examples

| Dispersion Identifier | Wax Type Name | Chemical Characteristics of Dispersing Agent; Meaning in General Formula (I) or Formula for $R^2$ of: | | | | | Dispersion Characteristics | | |
|---|---|---|---|---|---|---|---|---|---|
| | | $R^1$ | m | n | $R^3$ | $R^4$ | % of Solids That Is Wax | Average Particle Size, μm | Reason If Any Why Resin is not within the Scope of the Claims |
| W1 | 4202E | $C_9H_{19}$ | 12 | 0 | H | $CH=CHCH_3$ | 75 | 0.08 | |
| W2 | 2203A | $C_{18}H_{37}$ | 20 | 0 | $SO_3NH_4$ | H | 95 | 0.12 | |
| W3 | 4202E | $C_8H_{17}$ | 10 | 5 | H | H | 90 | 0.15 | |
| W4 | 4051E | $CH_2=CHCH_2$ | 10 | 5 | H | H | 80 | 0.15 | |
| W5 | 4202E | $C_9H_{19}$ | 12 | 0 | H | H | 85 | 0.45 | Particle size too large |
| W6 | NP055 | $C_{18}H_{37}$ | 20 | 0 | $SO_3NH_4$ | H | 90 | 0.10 | Wax is not an oxidized polyethylene type |

Notes for Table 4
All of the waxes used were products of Mitsui Kagaku KK and are sold under the trademark HIWAX in addition to the Type Number given in the Table. W1 through W5 are oxidized polyethylene waxes. W6 is a polypropylene wax. The acid values are 17 for type 4202E, 30 for type 2203A, 12 for type 4051E and 0 for type NP055.
All of the dispersion had 20% solids content, including both the wax and the dispersing agent, the balance of the dispersion being water.

+++ area of white rust production is less than 3% of the total area

++ area of white rust production is from 3% to less than 10% of the total area

+ area of white rust production is from 10% to less than 30% of the total area

× area of white rust production is at least 30% of the total area.

(2) Corrosion Resistance in Damaged Areas

The treated test substrate, cut to 30 mm×300 mm, was subjected to draw bead testing (bead tip with 1 mm radius of curvature, bead height=4 mm, die shoulder with 1 mm radius of curvature, pressing load=500 kg, temperature=30° C.). The sliding region of the test coupon was then subjected to salt-spray testing according to JIS Z-2371 for 120 hours in the case of the EG material, 240 hours in the case of the GF material, and the 360 hours in the case of the AL material. The status of white rust production was then evaluated and scored according to the same scale as used for the corrosion resistance in flat areas.

TABLE 5

Water-Based Surface Treatment Compositions (1–16) Used in the Working Examples and (17–25) Used in the Comparison Examples

| Identifying Number of The Water-Based Surface Treatment Agent | Components of the Water-Based Surface Treatment Compositions, with Identifiers from Tables 1–4 Followed by a Number in Parentheses That Is the % of the Total Solids of the Composition Supplied by the Component | | | | Resins Solids Curing Agent Solids Ratio | Solids Concentration of the Water-Based Surface Treatment Composition |
|---|---|---|---|---|---|---|
| | Resin | Curing Agent | Silica Powder | Water-based Wax Dispersion | | |
| 1 | A1 (72) | B1 (3) | C1 (20) | W1 (5) | 24.0 | 12.0% |
| 2 | A2 (72) | B1 (3) | C1 (20) | W1 (5) | 24.0 | 12.0% |
| 3 | A3 (72) | B1 (3) | C1 (20) | W1 (5) | 24.0 | 12.0% |
| 4 | A4 (72) | B1 (3) | C1 (20) | W1 (5) | 24.0 | 12.0% |
| 5 | A1 (72) | B2 (3) | C1 (20) | W1 (5) | 24.0 | 12.0% |
| 6 | A1 (72) | B1 (3) | C2 (20) | W1 (5) | 24.0 | 12.0% |
| 7 | A1 (82) | B1 (3) | C1 (10) | W1 (5) | 27.3 | 12.0% |
| 8 | A1 (63) | B1 (2) | C1 (30) | W1 (5) | 31.5 | 12.0% |
| 9 | A1 (61) | B1 (4) | C1 (20) | W1 (5) | 15.3 | 12.0% |
| 10 | A1 (80) | B1 (2) | C1 (10) | W1 (8) | 40.0 | 12.0% |
| 11 | A1 (70) | B1 (7) | C1 (20) | W1 (3) | 10.0 | 12.0% |
| 12 | A1 (72) | B1 (3) | C1 (20) | W2 (5) | 24.0 | 12.0% |
| 13 | A1 (72) | B1 (3) | C1 (20) | W3 (5) | 24.0 | 12.0% |
| 14 | A1 (72) | B1 (3) | C1 (20) | W4 (5) | 24.0 | 12.0% |
| 15 | A1 (72) | B1 (3) | C1 (20) | W1 (5) | 24.0 | 40.0% |
| 16 | A1 (72) | B1 (3) | C1 (20) | W1 (5) | 24.0 | 5.0% |

TABLE 5-continued

Water-Based Surface Treatment Compositions (1–16) Used in the Working
Examples and (17–25) Used in the Comparison Examples

| Identifying Number of The Water-Based Surface Treatment Agent | Components of the Water-Based Surface Treatment Compositions, with Identifiers from Tables 1–4 Followed by a Number in Parentheses That Is the % of the Total Solids of the Composition Supplied by the Component | | | | Resins Solids Curing Agent Solids Ratio | Solids Concentration of the Water-Based Surface Treatment Composition |
|---|---|---|---|---|---|---|
| | Resin | Curing Agent | Silica Powder | Water-based Wax Dispersion | | |
| 17 | A5 (72) | B1 (3) | C1 (20) | W1 (5) | 24.0 | 12.0% |
| 18 | A1 (72) | B1 (3) | C1 (20) | W5 (5) | 24.0 | 12.0% |
| 19 | A1 (72) | B1 (3) | C1 (20) | W6 (5) | 24.0 | 12.0% |
| 20 | A1 (74) | B1 (1) | C1 (20) | W1 (5) | 74.0 | 12.0% |
| 21 | A1 (50) | B2 (25) | C1 (20) | W1 (5) | 2.0 | 12.0% |
| 22 | A1 (80) | B1 (3) | C2 (2) | W1 (15) | 26.7 | 12.0% |
| 23 | A1 (48) | B1 (2) | C1 (45) | W1 (5) | 24.0 | 12.0% |
| 24 | A1 (76) | B1 (3) | C1 (20) | W1 (1) | 25.3 | 12.0% |
| 25 | A1 (50) | B1 (5) | C1 (20) | W1 (25) | 10.0 | 12.0% |

TABLE 6

Reasons Why Compositions 17–25 in Table 5 Are Not within the Scope of the Invention

| Composition Number | Reason |
|---|---|
| 17 | Different type of resin |
| 18 | Wax particle size outside scope |
| 19 | Wax type outside scope |
| 20 | Resin:Curing Agent ratio outside scope |
| 21 | Resin:Curing Agent ratio outside scope |
| 22 | Low silica content |
| 23 | High silica content |
| 24 | Low wax content |
| 25 | High wax content |

(3) Paint Adherence

A melamine-alkyd paint (AMILAC® #1000 paint, product of Kansai Paint Kabushiki Kaisha) was applied so as to form a post-baking film thickness of 25 μm, followed by baking for 20 minutes at 125° C. After the test specimen had been held for 24 hours after baking, a 100-square grid on a 1 mm interval was placed in the test specimen accordance with JIS Z-5400 and the paint film was then peeled with pressure-sensitive tape. The result was scored on the following scale:

+++ no peeling of the paint film

++ very slight peeling of the paint film, at least part of all 100 paint squares remaining + 95 to 99 paint squares remaining × less than 95 paint squares remaining.

Test results are reported in Tables 7 and 8. Examples 1 to 21, which used water-based surface treatment compositions of this invention, exhibited a good corrosion resistance in flat areas, good corrosion resistance in damaged areas, and good paint adherence. Comparative Examples 1 to 9, which employed water-based surface treatment compositions outside the scope of this invention, exhibited poor performance in at least three properties (corrosion resistance in flat areas, corrosion resistance in damaged areas, and paint adherence).

TABLE 7

Test Conditions and Coating Performance in the Working Examples

| Working Example Number | Substrate Material | Chromate Conversion Treatment | | Water-based Surface Treatment Composition | | Performance of the Coated Sheets | | |
|---|---|---|---|---|---|---|---|---|
| | | Type | Add-On, mg/m² of Cr | Identifying Number from Table 4 | Add-On mg/m² of Dried Resin Coating | Corrosion Resistance in: | | Paint Adherence |
| | | | | | | Flat Area | Damaged Area | |
| 1 | EG | Reactive | 20 | 1 | 1.0 | +++ | +++ | +++ |
| 2 | EG | Reactive | 20 | 2 | 1.0 | +++ | +++ | +++ |
| 3 | EG | Reactive | 20 | 3 | 1.0 | +++ | +++ | +++ |
| 4 | EG | Reactive | 20 | 4 | 1.0 | +++ | +++ | +++ |
| 5 | EG | Reactive | 20 | 5 | 1.0 | +++ | +++ | +++ |
| 6 | EG | Reactive | 20 | 6 | 1.0 | +++ | +++ | +++ |
| 7 | EG | Reactive | 20 | 7 | 1.0 | +++ | +++ | +++ |
| 8 | EG | Reactive | 20 | 8 | 1.0 | +++ | +++ | +++ |
| 9 | EG | Reactive | 20 | 9 | 1.0 | +++ | +++ | +++ |

TABLE 7-continued

Test Conditions and Coating Performance in the Working Examples

| Working Example Number | Substrate Material | Chromate Conversion Treatment Type | Chromate Conversion Treatment Add-On, mg/m² of Cr | Water-based Surface Treatment Composition Identifying Number from Table 4 | Water-based Surface Treatment Composition Add-On mg/m² of Dried Resin Coating | Performance of the Coated Sheets Corrosion Resistance in: Flat Area | Performance of the Coated Sheets Corrosion Resistance in: Damaged Area | Performance of the Coated Sheets Paint Adherence |
|---|---|---|---|---|---|---|---|---|
| 10 | EG | Reactive | 20 | 10 | 1.0 | +++ | +++ | +++ |
| 11 | EG | Reactive | 20 | 11 | 1.0 | +++ | +++ | +++ |
| 12 | EG | Reactive | 20 | 12 | 1.0 | +++ | +++ | +++ |
| 13 | EG | Reactive | 20 | 13 | 1.0 | +++ | +++ | +++ |
| 14 | EG | Reactive | 20 | 14 | 1.0 | +++ | +++ | +++ |
| 15 | EG | Reactive | 20 | 15 | 3.0 | +++ | +++ | +++ |
| 16 | EG | Reactive | 20 | 16 | 0.3 | ++ | ++ | +++ |
| 17 | EG | Dry-in-place | 20 | 1 | 1.0 | +++ | +++ | +++ |
| 18 | EG | Reactive | 10 | 1 | 1.0 | +++ | ++ | +++ |
| 19 | EG | Reactive | 50 | 1 | 1.0 | +++ | +++ | +++ |
| 20 | GF | Reactive | 20 | 1 | 1.0 | +++ | +++ | +++ |
| 21 | AL | Reactive | 20 | 1 | 1.0 | +++ | +++ | +++ |

TABLE 8

Test Conditions and Coating Performance in the Comparative Examples

| Comparative Example Number | Substrate Material | Chromate Conversion Treatment Type | Chromate Conversion Treatment Add-On, mg/m² of Cr | Water-based Surface Treatment Composition Identifying Number from Table 4 | Water-based Surface Treatment Composition Add-On mg/m² of Dried Resin Coating | Performance of the Coated Sheets Corrosion Resistance in: Flat Area | Performance of the Coated Sheets Corrosion Resistance in: Damaged Area | Performance of the Coated Sheets Paint Adherence |
|---|---|---|---|---|---|---|---|---|
| 1 | EG | Reactive | 20 | 17 | 1.0 | + | x | + |
| 2 | EG | Reactive | 20 | 18 | 1.0 | + | + | + |
| 3 | EG | Reactive | 20 | 19 | 1.0 | + | + | x |
| 4 | EG | Reactive | 20 | 20 | 1.0 | + | + | + |
| 5 | EG | Reactive | 20 | 21 | 1.0 | + | + | + |
| 6 | EG | Reactive | 20 | 22 | 1.0 | + | x | + |
| 7 | EG | Reactive | 20 | 23 | 1.0 | + | x | + |
| 8 | EG | Reactive | 20 | 24 | 1.0 | + | x | + |
| 9 | EG | Reactive | 20 | 25 | 1.0 | + | + | + |

What is claimed is:

1. A water-based liquid treatment composition for metal surfaces, said composition comprising water and:

(A) dissolved, dispersed, or both dissolved and dispersed urethane resin, acrylic resin; or both urethane and acrylic resins;

(B) dissolved, dispersed, or both dissolved and dispersed curing agent molecules;

(C) dispersed silica powder;

(D) dispersed oxidized polyethylene wax with an average particle size of 0.01 to 0.2 μm; and (E) dissolved, dispersed, or both dissolved and dispersed molecules that conform to the immediately following general chemical formula (I):

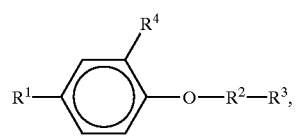

(I)

wherein: $R^1$ represents a $C_1$ to $C_{20}$ alkyl moiety or a $C_2$ to $C_{20}$ alkenyl moiety; $R^2$ represents a block homo-oligomer of oxyethylene or a block co-oligomer of oxyethylene and oxypropylene that conforms to the general chemical formula $-(C_2H_4O)_m-(C_3H_6)_n-$, wherein m represents an integer from 5 to 20 and n represents an integer from 0 to 10; $R^3$ represents a hydrogen moiety or $SO_3M$, where M represents a hydrogen atom, an alkali metal ion, or an ammonium ion; and $R^4$ represents a hydrogen atom, a $C_1$ to $C_4$ alkyl moiety, or a $C_2$ to $C_4$ alkenyl moiety, wherein, in said liquid composition: the total solids from components (A) and (B) constitute from 50 to 95% by weight of the total solids from components (A) through (E); the solids from component (C) constitute from 3 to 40% by weight of the total solids from components (A) through (E); the total solids from components (D) and (E) constitute from 2 to 20% by weight of the total solids from components (A) through (E); and the ratio by weight of solids from component (A) to solids from component (B) is from 4:1.0 to 49:1.00.

2. A water-based treatment composition according to claim 1, in which the solids from component (E) constitute from 5 to 40% by weight of the total solids from both components (D) and (E).

3. A water-based treatment composition according to claim 2, in which the resin of component (A) has a glass-transition temperature that is from −40 to 0° C.

4. A water-based treatment composition according to claim 1, in which the resin of component (A) has a glass-transition temperature that is from −40 to 0° C.

5. A water-based treatment composition according to claim 4 in which component (B) is epoxy resin.

6. A water-based treatment composition according to claim 5, in which said epoxy resin contains at least 3 epoxy groups in each molecule.

7. A water-based treatment composition according to claim 3 in which component (B) is epoxy resin.

8. A water-based treatment composition according to claim 7, in which said epoxy resin contains at least 3 epoxy groups in each molecule.

9. A water-based treatment composition according to claim 2 in which component (B) is epoxy resin.

10. A water-based treatment composition according to claim 9, in which said epoxy resin contains at least 3 epoxy groups in each molecule.

11. A water-based treatment composition according to claim 1 in which component (B) is epoxy resin.

12. A water-based treatment composition according to claim 11, in which said epoxy resin contains at least 3 epoxy groups in each molecule.

13. A metal object that has over at least a portion of its outer surface a two layer coating in which the inner layer is a chromate conversion coating that contains from 3 to 100 mg/m$^2$ of chromium atoms and an outer layer with a coating weight of from 0.3 to 3.0 g/m$^2$, said outer layer having been formed by application over the chromate conversion coating of a layer of a water-based treatment composition according to claim 1 and then drying said layer of water based composition in place over the chromate conversion coating.

14. A metal object that has over at least a portion of its outer surface a two-layer coating in which the inner layer is a chromate conversion coating that contains 3–100 gm/m$^2$ of chromium atoms and an outer layer with an coating weight of from 0.3 to 3.0 g/m$^2$, said outer layer being formed by the application over the chromate conversion coating of a layer of a water-based treatment composition according to claim 2 and then drying said layer of water-based treatment composition into place over the chromate conversion coating.

15. A metal object that has over at least a portion of its outer surface a two-layer coating in which the inner layer is a chromate conversion coating that contains 3 to 100 gm/m$^2$ of chromium atoms and an outer layer of a coating weight of from 0.3 to 3.0 g/m$^2$, said outer layer having been formed by application over the chromate conversion coating of a layer of water-based treatment composition according to claim 3 and then drying said layer of water-based treatment composition into place over the chromate conversion coating.

16. A metal object that has over at least a portion of its outer surface a two-layer coating in which the inner layer is a chromate conversion coating that contains 3 to 100 gm/m$^2$ of chromium atoms and an outer layer of a coating weight from 0.3 to 3.0 g/m$^2$, said outer layer having been formed by application of the chromate conversion coating of a layer of a water-based treatment composition according to claim 4 and then drying said layer of water-based treatment composition into place over the chromate conversion coating.

17. A metal object that has over a least a portion of its outer surface a two-layer coating in which the inner layer is a chromate conversion coating that contains 3 to 100 gm/m$^2$ of chromium atoms and in outer layer of a coating weight from 0.3 to 3.0 g/m$^2$, said outer layer having been formed by application of the chromate conversion coating of a layer of water-based treatment composition according to claim 5 and then dying said layer of water-based treatment composition into place over the chromate conversion coating.

18. The metal object that has over at least a portion of its outer surface, a two-layer coating in which the inner layer is a chromate conversion coating that contains a 3 to 100 gm/m$^2$ of chromium atoms and an outer layer of a coating weight from 0.3 to 3.0 g/m$^2$, said outer layer having been formed by application of the chromate conversion coating of a layer of water-based treatment composition according to claim 6 and then drying said layer of water-based treatment composition into place over the chromate conversion coating.

19. A metal object that has over at least a portion of its outer surface a two-layer coating in which the inner layer is a chromate conversion coating that contains a 3 to 100 gm/m$^2$ of chromium atoms and an outer layer of coating weight from 0.3 to 3.0 g/m$^2$ said outer layer having been formed by application of the chromate conversion coating of a layer of water-based treatment composition according to claim 7 and then drying said layer of water-based treatment composition into place over the chromate conversion coating.

20. A metal object that has over at least a portion of its outer surface a two-layer coating in which the inner layer is a chromate conversion coating that contains a 3 to 100 gm/m$^2$ of chromium atoms and an outer layer of coating weight from 0.3 to 3.0 g/m$^2$, said outer layer having been formed by application of the chromate conversion coating of a layer of water-based treatment composition according to claim 8 and then drying said layer of said water- based treatment composition into place over the chromate conversion coating.

21. A metal object that has over at least a portion of its outer surface a two-layer coating in which the inner layer is a chromate conversion coating that contains a 3 to 100 gm/m$^2$ of chromium atoms and an outer layer of coating weight from 0.3 to 3.0 g/m$^2$, said outer layer having been formed by application of the chromate conversion coating of a layer of water-based treatment composition according to claim 9 and then drying said layer of said water-based treatment composition into place over the chromate conversion coating.

22. A metal object that has over at least a portion of its outer surface a two-layer coating in which the inner layer is a chromate conversion coating that contains a 3 to 100 gm/m² of chromium atoms and an outer layer of coating weight from 0.3 to 3.0 g/m², said outer layer having been formed by application of the chromate conversion coating of a layer of water-based treatment composition according to claim 21 and then drying said layer of water-based treatment composition into place over the chromate conversion coating.

23. A metal object that has over at least a portion of its outer surface a two-layer coating in which the inner layer is a chromate conversion coating that contains a 3 to 100 gm/m² of chromium atoms and an outer layer of coating weight from 0.3 to 3.0 g/m², said outer layer having been formed by application of the chromate conversion coating of a layer of water-based treatment composition according to claim 11 and then drying said layer of water-based treatment composition into place over the chromate conversion coating.

24. A metal object that has over at least a portion of its outer surface a two-layer coating in which the inner layer is a chromate conversion coating that contains a 3 to 100 gm/m² of chromium atoms and an outer layer of coating weight from 0.3 to 3.0 g/m², said outer layer having been formed by application of the chromate conversion coating of a layer of water-based treatment composition according to claim 12 and then drying said layer of water-based treatment composition into place over the chromate conversion coating.

* * * * *

UNITED STATES PATENT AND TRADEMARK OFFICE
CERTIFICATE OF CORRECTION

PATENT NO. : 6,683,131 B1
DATED : January 27, 2004
INVENTOR(S) : Kinoshita et al.

It is certified that error appears in the above-identified patent and that said Letters Patent is hereby corrected as shown below:

Title page,
Item [57], ABSTRACT,
Line 14, delete "oxyethyleine" and insert -- oxyethylene --.
Line 19, delete "is".

Column 19,
Line 55, delete "an coating" and insert -- a coating --.

Column 20,
Line 23, delete "dying" and insert -- drying --.

Signed and Sealed this

Twenty-eighth Day of February, 2006

JON W. DUDAS
*Director of the United States Patent and Trademark Office*